(12) United States Patent
Laib et al.

(10) Patent No.: US 9,790,039 B2
(45) Date of Patent: Oct. 17, 2017

(54) UNIT LOAD DEVICE SHIPMENT LOADING SYSTEM FOR MIXED SHIPMENTS

(71) Applicant: Deutsche Post AG, Bonn (DE)

(72) Inventors: Jason Laib, Erlanger, KY (US); Daniel Schlake, Loveland, OH (US); Dean Terrell, Louisville, KY (US); Andrew Willis, Louisville, KY (US); Chad Fitzpatrick, Louisville, KY (US)

(73) Assignee: Deutsche Post AG, Bonn (DE)

( * ) Notice: Subject to any disclaimer, the term of this patent is extended or adjusted under 35 U.S.C. 154(b) by 592 days.

(21) Appl. No.: 14/026,827

(22) Filed: Sep. 13, 2013

(65) Prior Publication Data

US 2015/0078868 A1    Mar. 19, 2015

(51) Int. Cl.
*B65G 15/26* (2006.01)
*B65G 69/24* (2006.01)
*B65G 11/06* (2006.01)

(52) U.S. Cl.
CPC ............ *B65G 69/24* (2013.01); *B65G 11/063* (2013.01)

(58) Field of Classification Search
CPC .............................. B65G 15/26; B65G 11/063
See application file for complete search history.

(56) References Cited

U.S. PATENT DOCUMENTS

| | | | |
|---|---|---|---|
| 3,031,027 A | 4/1962 | Mitchell | |
| 3,184,045 A | 5/1965 | Fry | |
| 3,499,562 A | 3/1970 | Phillips | |
| 3,655,075 A | 4/1972 | Carder et al. | |
| 3,667,591 A * | 6/1972 | Sykes | B65G 11/063 198/756 |
| 3,825,107 A * | 7/1974 | Cary | B65G 15/26 198/313 |
| 3,826,353 A * | 7/1974 | Greasley | B65G 15/26 198/302 |
| 4,312,619 A | 1/1982 | Anderson et al. | |
| 4,787,111 A * | 11/1988 | Pacek | B65G 69/22 14/71.1 |
| 5,346,352 A | 9/1994 | Ito | |

(Continued)

FOREIGN PATENT DOCUMENTS

DE        10308680 A1    9/2004

OTHER PUBLICATIONS

Machine Translation of DE10308680A1 by Lexis Nexis Total Patent on May 15, 2015.

*Primary Examiner* — Jonathan Snelting
(74) *Attorney, Agent, or Firm* — Woodard, Emhardt, Moriarty, McNett & Henry LLP

(57) ABSTRACT

The invention relates to a shipment loading system for loading shipments into an unit load device, comprising a conveyer, a platform and a cargo space for placing the unit load device on a static rack, whereby the conveyer is provided on a ground floor and tiltable across its longitudinal axis, the conveyer comprises an extendo extending the conveyer along the longitudinal extension of the conveyer, the extendo is movable between a retracted position and an extracted position, in the extracted position the extendo faces the cargo space, the platform is movable between a first position and a second position along the longitudinal extension of the conveyer, in the first position the platform faces the cargo space and at least in one of the first and second positions the platform is arranged between the ground floor and the conveyer.

20 Claims, 3 Drawing Sheets

(56) References Cited

U.S. PATENT DOCUMENTS

| | | | |
|---|---|---|---|
| 5,476,360 A | 12/1995 | Liljevik | |
| 5,642,803 A | 7/1997 | Tanaka | |
| 5,743,217 A * | 4/1998 | Jerome | A01K 45/005 119/846 |
| 6,286,629 B1 | 9/2001 | Saunders | |
| 6,447,234 B2 * | 9/2002 | Sinn | A01K 45/005 119/846 |
| 6,481,563 B1 * | 11/2002 | Gilmore | B65G 67/08 198/511 |
| 6,564,751 B2 * | 5/2003 | Anderson | A01K 45/005 119/845 |
| 7,134,860 B2 * | 11/2006 | Pierik | B29C 37/00 425/152 |
| 7,234,590 B1 * | 6/2007 | Le Borgne | B65G 21/12 198/592 |
| 7,281,496 B2 * | 10/2007 | Calabria | B60P 3/04 119/401 |
| 7,305,748 B2 * | 12/2007 | Sprague | B21J 15/14 29/525.01 |
| 8,596,947 B1 | 12/2013 | Stenzel | |
| 8,801,358 B2 | 8/2014 | Kussner | |
| 2008/0230321 A1 | 9/2008 | Csaszar et al. | |
| 2013/0213744 A1 | 8/2013 | Foley | |
| 2013/0287538 A1 | 10/2013 | Nyquist | |

* cited by examiner

UNIT LOAD DEVICE SHIPMENT LOADING SYSTEM FOR MIXED SHIPMENTS

BACKGROUND OF THE INVENTION

The invention relates to a shipment loading system for loading shipments into a unit load device comprising a conveyer, a platform and a cargo space for placing the unit load device on a ground floor. The invention further relates to a method for loading the unit load device with the shipment loading system.

A unit load device, often abbreviated as ULD, is a container or pallet used to load luggage, freight, shipments and/or mail on aircrafts. ULDs are preferably used for express shipments to be delivered by said aircrafts, as the ULD allows a larger quantity of cargo respectively shipments to be bundled into a single unit i.e. into the unit load device. The ULD can then be loaded into an aircraft and unloaded from, respectively, an aircraft by specialized motorized means, as known from prior art. Since the shipments are bundled into a single unit this leads to few pieces to load and unload from the aircraft and thus saves time and effort.

ULD containers, also referred to as cans or pods, are most often closed containers made of aluminum, having at least one door and sometimes even built-in refrigeration units.

ULD pallets are often provided with rubbed sheets of aluminum with rims to lock onto so-called cargo net lugs.

Aviation unit load devices are standardized in several types, for example container types LD1, LD2, LD3, LD6, LD8 and LD11, which have different width, but the same depth and height. The most common container type is called LD3 having a volume of 4.5 m³. For example, a Boeing 777 can load up to 44 LD3s.

Express shipments transported by a unit load device often comprise so-called "mixed" shipments having both conveyable shipments as well as forkable shipments that can only be moved with a lift truck. The loading of such ULDs with mixed shipments by using prior art systems is very time-consuming and thus cost-expensive. In addition, the loading is also very unergonomic for an operator as the operator basically has to grab manually each conveyable shipment and place it into an interior of the unit load device. The operator needs to stoop down very often to grab the shipment e.g. from a motorized transporting means in order to place it on a higher place onto the ULD, above other shipments placed before. As a result, operators often become ill or injured as such handling is not very ergonomic for human beings.

BRIEF SUMMARY OF THE INVENTION

It is therefore an object of the invention to provide a system and an associated method for more efficiently and more ergonomically loading shipments into an aviation unit load device. One way of achieving the object is by the independent claims with preferred embodiments detailed in the dependent claims.

Thus, the object is solved by a shipment loading system for loading shipments into an unit load device, comprising a conveyer, a platform and a cargo space for placing the unit load device on a static rack, whereby the conveyer is provided on the ground floor and tiltable across its longitudinal axis, the conveyer comprises an extendo extending the conveyer along the longitudinal extension of a conveyer, the extendo is movable between a retracted position and an extracted position, in the extracted position the extendo faces the cargo space, the platform is movable between a first position and a second position along the longitudinal extension of the conveyer, in the first position the platform faces the cargo space and at least in one of the first and second positions the platform is arranged between the ground floor and the conveyer.

The invention therefore provides a system for very efficiently and ergonomically loading shipments, for example express shipments, into an aviation unit load device. In particular, the system as described above significantly speeds-up the loading compared to loading of unit load devices to prior art systems. More particularly, the system provides for a very ergonomic loading experience for the operators loading unit load devices with shipments, especially if the shipments comprise both conveyable shipments as well as forkable shipments to be moved with a lift truck.

In detail, the system comprises a unique combination of different features. First, the system comprises a movable platform to be used by an operator for loading the unit load device. Such unit load device, also abbreviated as ULD, most often comprises an opening at one of its sides. In a case of mixed shipments, the operator may first load the ULD with forkable shipments. Thereafter, in order to easily place additionally conveyable shipments on top of the forkable shipments already placed within the ULD, the operator may move the platform from its second position towards the first position facing the cargo space, on which the ULD to be loaded is placed on. This way, the operator may stand onto the platform in order to easily access the interior of the ULD for placing the conveyable shipments on top of the forkable shipments. As the platform is configured to be moveable, the operator may move the platform back and forth according to the required position. Preferably the platform comprises roller wheels and/or a vertical ladder with a spring gate for easily accessing the platform. More preferably, the platform comprises a motorized means for moving the roller wheels i.e. the platform forth and back. In another embodiment the static rack is provided as ground floor in a storage depot or comprises a height of 10 cm, 20 cm or 50 cm above the ground floor.

As another key feature, the system comprises the tiltable arranged conveyer, which, due to the extendibility provided by the extendo, allows for bringing the shipments very close to the operator. In such a way the placing of the shipments into the ULD is much simpler for the operator compared with prior art systems. The operator just needs to grab the shipment from the conveyer and put it into the ULD without walking, traversing, and/or climbing ladders. As the conveyer is tiltable, the conveyer preferably comprises a hydraulic tilt for swiveling the conveyer, and in addition is extendable along its longitudinal extension, so the operator may simply tilt the conveyer and extend the conveyer with the extendo such that shipments are delivered to the operator on a required height and distance.

Furthermore, if the operator decides to move the platform he may in turn also extend and respectively retract the extendo to "follow" the movement of the platform. This way, shipments can be delivered directly "into the hands" of the operator, even when standing at different positions on the platform or even standing on the ground floor. In sum, such unique combination of features significantly speeds-up the loading of a ULD while in turn maximizing the loading much more economic for the operator.

Preferably, the extendo extends in a parallel direction as the longitudinal extension of the conveyer. More preferably, the platform is movable along the same longitudinal extension of the conveyer, preferably parallel to the longitudinal extension of the conveyer. The ground floor may be provided as the ground floor of a storage hall used for loading and/or unloading unit load devices, preferably arranged at an airport. The platform is arranged between the ground floor and the conveyer means, preferably such that first the platform is provided onto the ground floor, i.e. above the ground floor, and that the conveyer is provided above the platform.

According to another preferred embodiment the platform does not face the cargo space in the second position and is therefore nested out of way, the platform is arranged between the ground floor and the conveyer in the second position and/or the extendo does not face the cargo space in the retracted position. Such embodiment basically means that both the platform and the extendo can be moved such that the unit load device can be accessed for example to load forkable shipments. Preferably, the unit load device is loaded into the static rack for its loading position from a rear side via a so called ball or respectively, a caster deck. It is also possible that only the extendo faces the cargo space i.e. reaches towards the cargo space such that an operator may grab shipments delivered via the extendo and place the shipments just by turning into the cargo space i.e. without walking or moving. Thus, the system can be used in a very flexible manner for loading the unit load device using, for example, only the conveyer and/or by using the extendo, while the operator may stand onto the platform or not on the platform, i.e. on the ground floor.

According to another preferred embodiment, the conveyer and/or the extendo are provided as a belt conveyer, as a band conveyer, and/or as a roller belt. Preferably, the conveyer and the extendo, if in the extracted position, are configured such that the belt conveyer, the band conveyer, and/or the roller seamlessly place the shipments onto the extendo. In regard to the extracted position the extendo may comprise different extracted positions provided between a fully retracted position and a fully extracted position, referred to in the following as extracted positions. The extracted position might be changeable in a seamless manner and/or in concrete steps of for example 5 cm or 10 cm. The conveyer and/or the extendo are preferably powered by a belt drive motor. The moving of the extendo between its retracted and extracted positions is preferably also performed by a motorized means.

Generally, the platform may comprise any means known from prior art for effecting the movement between the first position and the second position. However, according to an especially preferred embodiment the platform comprises one pair of casters and one pair of v-groove wheels for running in a track, preferably provided on the ground floor. Such an embodiment advantageously keeps the platform from tipping, whereby further preferably a latch or a stop is provided to prevent side to side movement during use. More preferably, the platform comprises a handrail and/or an end of the platform comprises a pair of chains to be used to open or close that end to a single post on an inside corner for allowing the extendo type to be used in this position.

According to another preferred embodiment the platform comprises a load deck, the platform comprises a height of at least two feet, preferably of at least two feet and six inches and the platform is arranged at said height. This means that the platform, when standing on the ground floor, comprises said height, whereby the load deck is arranged at said height above ground and preferably adapted for supporting an operator. Preferably, the platform comprises a rectangular load deck, whereby one longitudinal side faces the cargo space and one traverse side faces the conveyer. More preferably, the load deck comprises a flat surface. Along its longitudinal side the platform may comprise a length of 11 feet, whereby the platform is arranged for moving across a distance of 24 feet between the first position and the second position.

According to another preferred embodiment the system comprises a spiral chute arranged nearby the conveyer such that shipments sliding on the spiral chute land on the conveyer. Such embodiment is especially advantageous as it allows for a very easy and economic placing of shipments on the spiral chute. The shipments then slide down the spiral chute and land automatically on the conveyer, which conveys the shipments to the operator for placing the shipments into the unit load device. In a further embodiment the spiral chute is provided as a spiral slide.

According to another preferred embodiment the shipment loading system comprises the unit load device having an opening for accessing the interior of the unit load device and, if the unit load device is placed onto the cargo space, the opening faces the platform in the first position and the extendo in the extracted position. According to another preferred embodiment the opening comprises a planar extension and, if the unit load device is placed onto the cargo space, the planar extension of the opening is parallel to the longitudinal extension of the conveyer. Such arrangement of the conveyer of the platform and of the unit load device is especially advantageous as it allows for a very economic and ergonomic loading of the unit load device.

The object of the invention is further addressed by a method for loading an unit load device with a shipment loading system as described before, comprising the steps of: a) placing the unit load device on the cargo space, c) moving the platform from the second position to the first position, and d) extracting the extendo from the retracted position into the extracted position.

According to another preferred embodiment the method also comprises the step of: b) loading the unit load device with forkable shipments with the drivable means.

According to a further another preferred embodiment the method also comprises the steps of: e) retracting the extendo from the extracted position into the retracted position, and f) moving the platform from the first position to the second position.

In another embodiment the method does not comprise step a).

Such method allows for a very efficient loading of a unit load device especially with so-called "mixed" shipments. First, according to step a) the unit load device can be positioned on the cargo space for example with a lift truck as drivable means and/or by human means such as an operator via a caster respectively ball deck. Thereafter, the lift truck may load during step b) forkable shipments into the unit load device. Thereafter, the movable platform may be moved during step c) from the second position to the first position such that the movable platform preferably is placed in insertion direction into the unit load device respectively faces the opening of the unit load device. Especially step b) provides the immense advantage that the unit load device does not have to be moved from the loading of forkable material to the loading of conveyable material. This maximizes density in the storage hall and maximizes efficiency in loading the unit load device, as no extra movement of the unit load device is required.

Preferably, the platform and the unit load device are arranged adjacent to each other, for example 10 cm or 20 cm away form each other. An operator may now climb onto the platform and bring, during step d), the extendo from its retracted position into an extracted position such that the operator may grab shipments being delivered via the extendo without walking, for example just by turning to the side for grabbing the shipments, thereafter turning back and placing the shipments, again without walking, within the unit load device.

When the loading of the conveyable shipments into the unit load device is finished, the operator may leave the platform and retract the extendo first during step e), before moving the platform from the first position to the second position in step e) such that the unit load device can be transported from the cargo space, for example for placing the so loaded unit load device into an aircraft.

These and other objects of the invention will become apparent in connection with the following description in conjunction with the accompanying drawings.

DETAILED DESCRIPTION OF THE INVENTION

Figure 1:
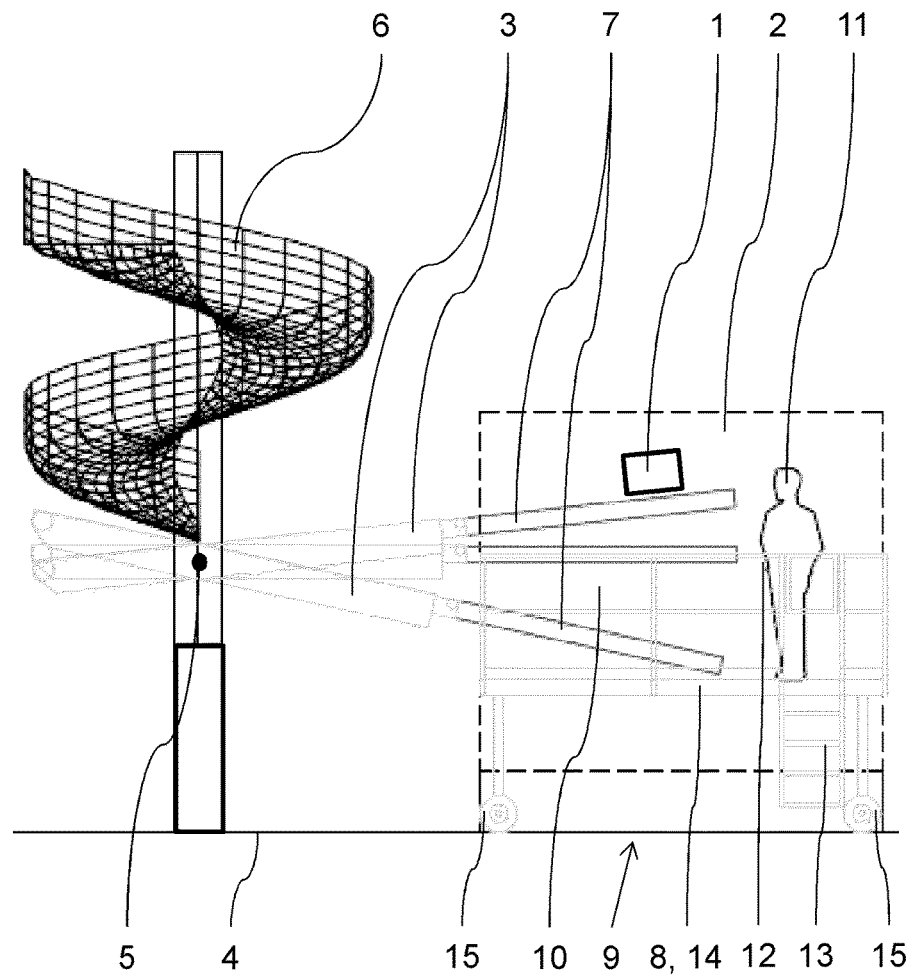
FIG. 1 is a side view of a shipment loading system according to a preferred embodiment with a platform in the first position.

FIG. 1 shows a shipment loading system for loading shipments 1 into a unit load device 2 in a side view.

The system comprises a conveyer 3 provided on a ground floor 4 of a storage hall at an airport. The conveyer 3 comprises a length of around 11 feet and is attached tiltable across its longitudinal axis 5 to the ground floor and provided as a belt conveyer having a belt drive motor. Thereby, the conveyer is tiltable with an angle of 12° above or below the horizontal in seamless steps.

Shipments 1 reach the conveyer 3 via a spiral chute 6. The spiral chute 6 comprises a side guard funnel, which guides shipments sliding down the spiral chute 6 towards the conveyer belt 3. This way, a shipment 1 placed onto the spiral chute 6 reaches the conveyer 3 and an extendo 7 extending the conveyer 3 along its longitudinal extension. The extendo 7 is flexibly movable between a retracted position and an extracted position, as shown in FIG. 1, and basically extends the conveyer 3 in a flexible manner.

Figure 2:
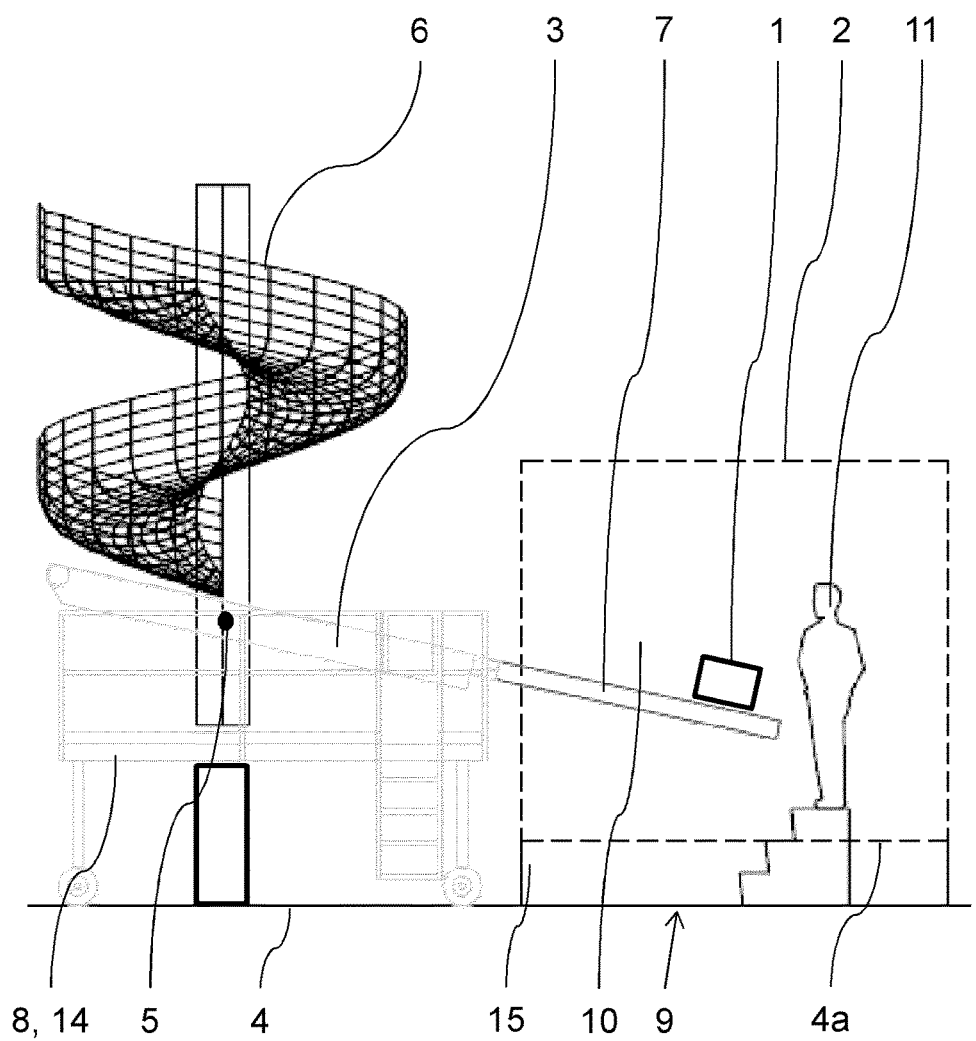
FIG. 2 shows the system according to FIG. 1 with the platform in a second position.

The system further comprises a movable platform 8, which is movable between a first position as shown in FIG. 1 and a second position shown in FIG. 2. In the first position the platform 8 faces the unit load device 2, which is placed on a cargo space 9 on a static rack 4a provided on the ground floor 4. The cargo space 9 can be provided even with the ground floor 4 or at an elevated level above the ground floor 4 as the static rack 4a. The platform 8 is arranged adjacent to the opening 10 of the unit load device 2 such that an operator 11 standing onto the platform 8 can easily reach the interior of the unit load device 2 with his hands.

This means that shipments 1 delivered to the operator 11 can be easily grabbed from the operator 11 and placed into the unit load device 2 without the operator 11 needing to walk, either towards the conveyer 3 and/or towards the unit load device 2. As the extendo 7 is seamlessly extendable between the retracted and extracted position, the operator 11 may first move the platform 8 and then extract and respectively retract the extendo 7 such that the end of the extendo 7 facing the operator 11 is provided adjacent to the operator 11. This way, the loading of shipments 1 into the unit load device 2 can be performed very economically. Furthermore, as the conveyer 3 and the extendo 7 are arranged tiltable, as shown in FIG. 1 in three different positions, the operator 11 can choose an appropriate position such that shipments 1 are delivered "into the hands" of the operator 11 in order to avoid any bending down known as required with prior art systems.

Figure 3:
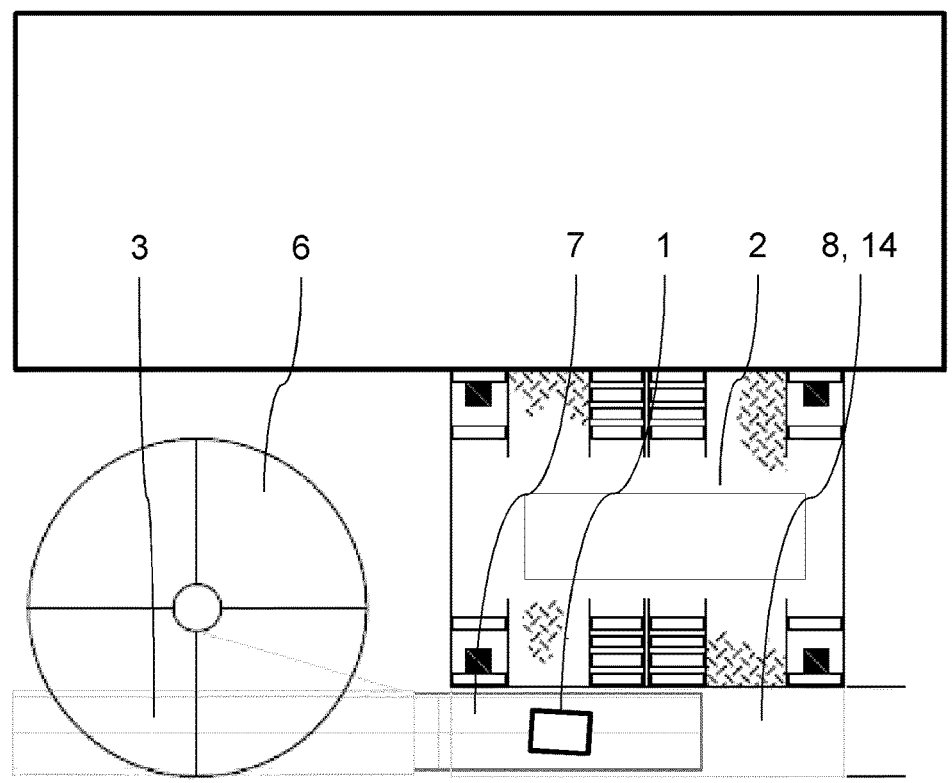
FIG. 3 shows the system of FIG. 1 in a top view.

The platform 8 comprises handrails 12 and a vertical ladder with a spring gate 13. The platform 8 furthermore comprises a load deck 14 for the operator 11 to stand on, whereby the load deck 14 and respectively the platform 8 comprise a rectangular dimension, as can be seen from FIG. 3 in a top view. FIG. 3 also shows that the longitudinal side of the platform 8 adjacently faces the unit load device 2. The load deck 14 is provided at a height of two feet and six inch above the ground floor 4.

For moving the platform 8 between a first position and a second position the platform 8 comprises one pair of casters and one pair of v-groove wheels 15, which run in a track provided within the ground floor 4 having a hold down to keep the platform 8 from tipping. As can be seen from FIG. 3, both the platform 8 and the extendo 7 are movable between its positions, i.e. between the first and the second position, respectively between the retracted and extracted position, in a direction parallel to the longitudinal extension of the unit load device 2.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS

Shipment 1
Unit load device 2
Conveyer 3
Ground floor 4
Static rack 4a
Attached across longitudinal axis 5
Spiral chute 6
Extendo 7
Platform 8
Cargo space 9
Opening 10
Operator 11
Handrails 12
Ladder 13
Load deck 14
Casters and wheels 15

The invention claimed is:

1. A shipment loading system for loading shipments into a unit load device through an opening in the unit load device, comprising:

a conveyer;
a platform provided on a ground floor, wherein the platform comprises a load deck elevated above the ground floor and a handrail that extends above the load deck, wherein the load deck is adapted for an operator to stand on while loading the unit load device; and
a cargo space for placing the unit load device on a static rack ,
wherein the conveyer is provided on the ground floor and tiltable across a longitudinal axis,
the conveyer comprises an extendo extending the conveyer along a longitudinal extension of the conveyer,
the extendo is movable between a retracted position and an extracted position,
in the extracted position the extendo faces the unit load device in the cargo space,
the platform is movable relative to the conveyor between a first position and a second position along the longitudinal extension of the conveyer,
in the first position the platform faces the opening of the unit load device in the cargo space and
at least in one of the first and second positions the conveyer is above and overlaps the platform.

2. The shipment loading system according to claim 1, wherein in the second position the platform does not face the cargo space, in the second position the platform is arranged between the ground floor and the conveyer, and/or in the retracted position the extendo does not face the cargo space.

3. The shipment loading system according to claim 1, wherein at least one of the conveyer and the extendo are provided as at least one of the group consisting of a belt conveyer, a band conveyer, and a roller belt.

4. The shipment loading system according claim 1, wherein the platform comprises one pair of casters and one pair of v-groove wheels for running in a track on the ground floor.

5. The shipment loading system according to claim 1, wherein the platform comprises a load deck, the platform comprises a height of at least two feet, and the load deck is arranged at said height.

6. The shipment loading system according to claim 1, comprising a spiral chute arranged adjacent to the conveyer such that shipments sliding on the spiral chute land on the conveyer.

7. The shipment loading system according to claim 1, comprising the unit load device having an opening for accessing the interior of the unit load device and, if the unit load device is placed onto the cargo space, the opening faces the platform in the first position and the opening faces the extendo in the extracted position.

8. The shipment loading system according claim 7, wherein the opening comprises a planar extension and, if the unit load device is placed onto the cargo space, the planar extension of the opening is parallel to the longitudinal extension of the conveyer.

9. The shipment loading system according to claim 1, wherein the shipment loading system is adapted to:
a) place the unit load device on the cargo space;
c) move a platform from a second position to a first position; and
d) extract an extendo from a retracted position into an extracted position.

10. The shipment loading system according to claim 9, wherein the shipment loading system is adapted to:
b) load the unit load device with forkable shipments with a drivable machine.

11. The shipment loading system according to claim 10, wherein the shipment loading system is adapted to:
e) retract the extendo from the extracted position into the retracted position; and
(f) move the platform from the first position to the second position.

12. The shipment loading system according to claim 1, wherein the conveyer is adapted to extend and retract the extendo to follow the movement of the platform.

13. The shipment loading system according to claim 1, wherein the platform further comprises roller wheels for moving the platform between the first position and the second position.

14. The shipment loading system according to claim 1, wherein the platform further comprises a motorized means for moving the platform between the first position and the second position.

15. The shipment loading system according to claim 1, further comprising a ladder that extends below the load deck toward the ground floor.

16. The shipment loading system according to claim 15, further comprising a spring gate positioned above the ladder that provides operator access through the handrail.

17. The shipment loading system according to claim 1, wherein a relative longitudinal position of a pivot point of the conveyor and the static rack are fixed relative to each other.

18. The shipment loading system according to claim 17, wherein, in the second position, the platform does not face the opening of the unit load device in the cargo space such that a forktruck can access the opening in the unit load device when the unit load device is on the static rack.

19. The shipment loading system according to claim 1, wherein the platform further comprises a first support that extends vertically between one side of the platform and the ground and a second support that extends vertically between an opposite side of the platform and the ground.

20. The shipment loading system according to claim 1, wherein neither the conveyor belt nor the extendo are attached to the platform.

* * * * *